United States Patent
Shin et al.

(10) Patent No.: US 7,580,250 B2
(45) Date of Patent: Aug. 25, 2009

(54) DISPLAY DEVICE

(75) Inventors: Jin-soo Shin, Cheonan-si (KR);
Jeoung-gwen Lee, Suwon-si (KR);
Wee-joon Jeong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 11/923,730

(22) Filed: Oct. 25, 2007

(65) Prior Publication Data

US 2008/0101001 A1 May 1, 2008

(30) Foreign Application Priority Data

Oct. 25, 2006 (KR) .................. 10-2006-0103859

(51) Int. Cl.
*G06F 1/16* (2006.01)
(52) U.S. Cl. .................... 361/679.21; 349/58
(58) Field of Classification Search ............ 361/679.01, 361/679.02, 679.21–679.3; 349/58
See application file for complete search history.

(56) References Cited

U.S. PATENT DOCUMENTS 6,667,780 B2 * 12/2003 Cho ........................... 349/58
6,847,416 B2 * 1/2005 Lee et al. ..................... 349/58
2006/0290836 A1 * 12/2006 Chang ......................... 349/58
2007/0236910 A1 * 10/2007 Yun et al. ..................... 362/29
2008/0030649 A1 * 2/2008 Choi et al. .................... 349/64

* cited by examiner

Primary Examiner—Lisa Lea-Edmonds
(74) Attorney, Agent, or Firm—Cantor Colburn LLP

(57) ABSTRACT

A display device includes a display panel; a backlight unit disposed behind the display panel; a panel supporting part; and a first cover. The first cover includes a first cover part disposed along a non-display region of the display panel. The display device further includes a plurality of second cover parts extending downward from the first cover part. The panel supporting part includes a first supporting part disposed between the display panel and the backlight unit. The first supporting part supports the display panel. The panel supporting part also includes a plurality of second supporting parts extending upward from an edge portion of the first supporting part. The second supporting part is disposed alternately with the second cover parts. The second cover parts and the second supporting part face the lateral side of the display panel.

20 Claims, 8 Drawing Sheets

DISPLAY DEVICE

This application claims priority to Korean Patent Application No. 2006-0103859, filed on Oct. 25, 2006, and all benefits accruing therefrom under 35U.S.C. § 119, the contents of which in its entirety are incorporated herein by reference.

BACKGROUND OF THE INVENTION

1. Field of Invention

The present invention relates to a display device, more particularly, to a display device where a cover that surrounds a display screen is reduced in width.

2. Description of the Related Art

Recently, a flat panel display device, such as a liquid crystal display ("LCD"), a plasma display panel ("PDP") and an organic light emitting diode ("OLED"), has been frequently used.

An LCD includes an LCD panel and a backlight unit. The LCD panel includes a first substrate where thin film transistors ("TFTs") are formed, a second substrate which faces the first substrate and a liquid crystal layer disposed between the substrates. The LCD panel does not emit light by itself and is provided with light from the backlight unit. Transmittance of the light irradiated from the backlight unit is adjusted according to the alignment of liquid crystals.

The LCD panel and the backlight unit are accommodated in a cover, and an opening is formed in the cover to expose a display region of the LCD panel. A panel supporting part is provided between the LCD panel and the backlight unit to support the LCD panel.

The cover, i.e., a bezel, to surround a screen is required to be reduced in width to improve the external look of the LCD. However, it is not easy to reduce the width of the bezel as the panel supporting part to support the LCD panel and the cover overlap.

BRIEF SUMMARY OF THE INVENTION

Accordingly, it is an aspect of the present invention to provide an LCD in which a cover that surrounds a screen is reduced in width.

The foregoing and/or other aspects, features, and advantages of the present invention may be achieved by providing a display device including: a display panel; a backlight unit disposed behind the display panel; a panel supporting part; and a first cover. The first cover includes a first cover part disposed along a non-display region of the display panel. The display device further includes a plurality of second cover parts extending downward from the first cover part. The panel supporting part includes a first supporting part disposed between the display panel and the backlight unit. The first supporting part supports the display panel. The panel supporting part also includes a plurality of second supporting parts extending upward from an edge portion of the first supporting part. The second supporting part is disposed alternately with the second cover parts. The second cover parts and the second supporting part face the lateral side of the display panel.

According to an aspect of the present invention, the second supporting parts and the second cover parts are disposed substantially in a same plane.

According to an aspect of the present invention, lateral sides of the second supporting parts and lateral sides of the second cover parts at least partially face each other.

According to an aspect of the present invention, the second supporting parts and the second cover parts do not overlap with each other in a plane where the display panel is provided.

According to an aspect of the present invention, the first supporting part has a rectangular shape, and at least one of the second supporting parts is provided at every side of the first supporting parts.

According to an aspect of the present invention, the first cover part has a rectangular shape, and at least one of the second cover parts is provided at every side of the first cover parts.

According to an aspect of the present invention, the panel supporting part further includes a third supporting part extending from the first supporting part and surrounding a lateral side of the backlight unit.

According to an aspect of the present invention, at least a part of the second cover parts faces the third supporting part and is disposed outside the third supporting part, and the third supporting part which faces the second cover parts forms a first accommodating space wherein the second cover parts extend in a perpendicular direction to the display panel.

According to an aspect of the present invention, the second cover parts and a part of the third supporting part which is not covered with the second cover parts are disposed substantially in a same plane.

According to an aspect of the present invention, the display device further includes a second cover which includes a third cover part disposed below the backlight unit and a fourth cover part extending from the third cover part and surrounding a lateral side of the backlight unit, wherein the fourth cover part extends between the backlight unit and the third supporting part.

According to an aspect of the present invention, the third supporting part which faces the fourth cover part forms a second accommodating space in which the fourth cover part is accommodated.

According to an aspect of the present invention, the first cover part includes a first sub-part of a rectangular band shape disposed inward; and a second sub-part of a rectangular band shape which surrounds the first sub-part and is disposed lower than the first sub-part.

According to an aspect of the present invention, the display panel includes a liquid crystal display panel.

The foregoing and/or other aspects of the present invention can be achieved by providing a display device including: a display panel; a backlight unit disposed behind the display panel; a panel supporting part disposed between the display panel and the backlight unit and supporting the display panel; and a cover including an opening formed therein to expose a display region of the display panel. A first region of a lateral side of the display panel faces the panel supporting part, a second region of the lateral side of the display panel faces the cover, wherein the first region is different from the second region, and the panel supporting part and the cover do not overlap with each other in a plane where the display panel is provided.

According to an aspect of the present invention, the panel supporting part facing the display panel and the cover are disposed substantially in a same plane.

According to an aspect of the present invention, the cover includes a first cover part which surrounds a non-display region of the display panel, an opening and a second cover part extending from the first cover part and facing the second region. The first cover part includes a first sub-part of a rectangular band shape disposed inward, and a second sub-part of a rectangular band shape which surrounds the first sub-part. The second sub-part is disposed lower than the first sub-part.

According to an aspect of the present invention, the display panel includes a liquid crystal display panel.

BRIEF DESCRIPTION OF THE DRAWINGS

The above and/or other aspects, features, and advantages of the present invention will become apparent and more readily appreciated from the following description of the exemplary embodiments, taken in conjunction with the accompanying drawings, in which.

DETAILED DESCRIPTION OF THE INVENTION

Figure 1:
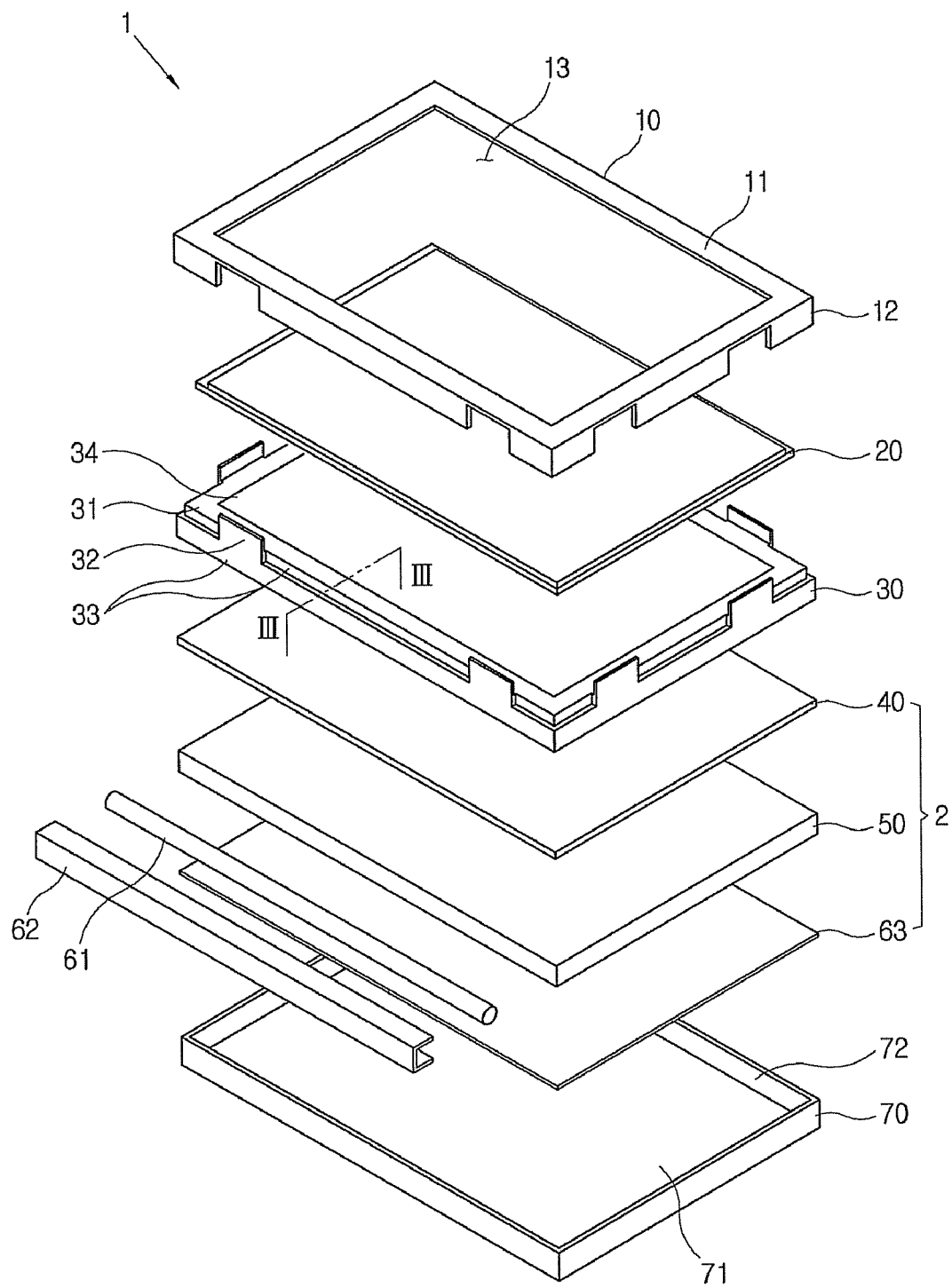
FIG. 1 is an exploded perspective view of a first exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

The following descriptions are directed to a particular type of display device, i.e., a liquid crystal display device, for purposes of illustration. However, it will be understood that the exemplary embodiments are not so limited. For example, other display devices such as a PDP and an OLED may also be within the scope of these exemplary embodiments.

Hereinafter, an LCD according to a first exemplary embodiment of the present invention will be described with reference to FIGS. 1 through 5.

The LCD 1 includes an LCD panel 20 and a backlight unit 2 disposed behind the LCD panel 20. The backlight unit 2 includes an optical film 40 disposed behind the LCD panel 20, a light guiding plate 50 disposed behind the LCD panel 20, a pair of lamps 61 disposed along opposite sides of the light guiding plate 50, a lamp cover 62 to cover each of the lamps 61, and a reflective plate 63 disposed below the light guiding plate 50.

The LCD panel 20 and the backlight unit 2 are disposed between an upper cover 10 and a lower cover 70. The LCD panel 20 is seated in a panel supporting part 30.

The upper cover 10 includes a first cover part 11 in a shape of a substantially rectangular tape and a second cover part 12 extending downward from the first cover part 11 toward the panel supporting part 30. The second cover part 12 may be substantially perpendicular to the first cover part 11. An opening 13 surrounded by the first cover part 11 exposes a display region of the LCD panel 20. The upper cover 10 may include aluminum or stainless steel.

In an exemplary embodiment, the second cover part 12 is divided into a plurality of parts which are formed at all sides of the first cover part 11. An inside portion of the second cover part 12 faces lateral sides of the LCD panel 20.

The LCD panel 20 includes a first substrate 21 where TFTs are formed and a second substrate 22 which faces the first substrate 21. The second substrate 22 may include a color filter. A liquid crystal layer (not shown) is disposed between the substrates 21 and 22.

A first polarizing plate 23 adheres to an outside surface of the first substrate 21, and a second polarizing plate 24 adheres to an outside surface of the second substrate 22. The first substrate 21 may be larger than the second substrate 22, and a driving circuit (not shown) adheres to a portion of the first substrate 21 which does not face the second substrate 22 due to the size difference.

The panel supporting part 30 includes a first supporting part 31 having a substantially rectangular tape shape, a second supporting part 32 extending upward from an edge portion of the first supporting part 31 toward the second cover part 12 and substantially perpendicular to the first supporting part 31. The panel supporting part 30 also includes a third supporting part 33 extending downward from the edge portion of the first supporting part 31 toward the lower cover 70. The panel supporting part 30 may be made of plastic.

Figure 4:
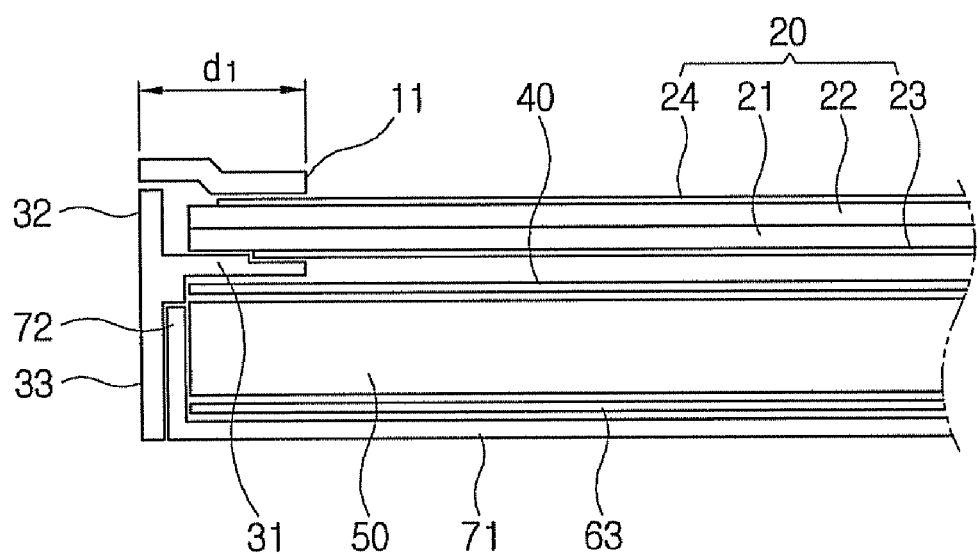
FIG. 4 is a cross-sectional view of the LCD shown in FIG. 2, taken along line IV-IV.
Figure 5:
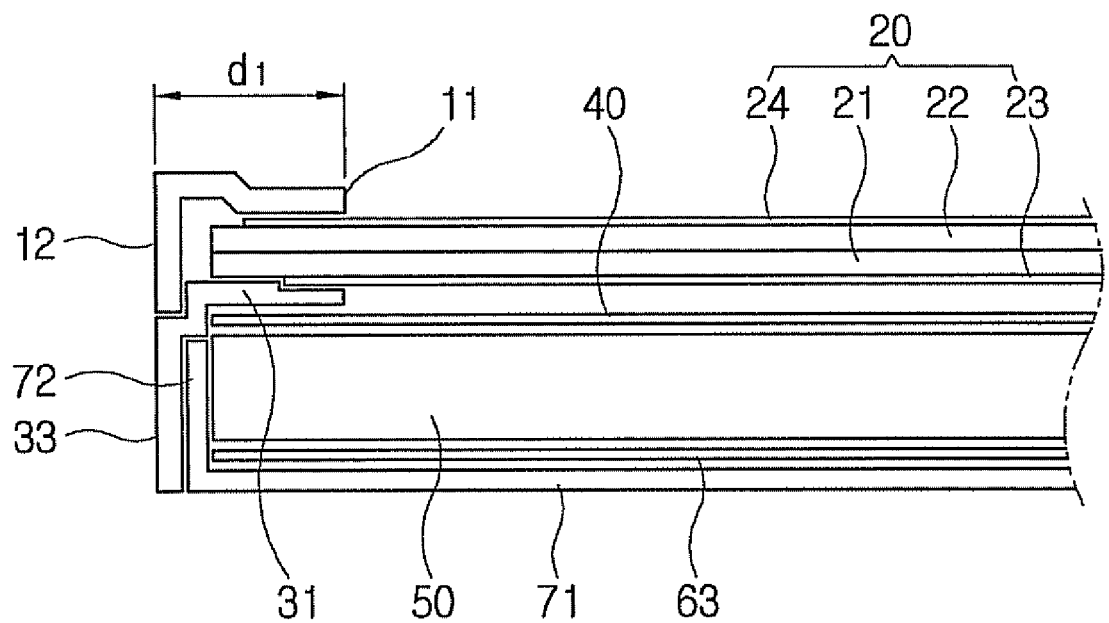
FIG. 5 is a cross-sectional view of the LCD shown in FIG. 2, taken along line V-V.

The first supporting part 31 is disposed between the LCD panel 20 and the optical film 40, as shown FIGS. 4 and 5, and the LCD panel 20 is seated on the first supporting part 31.

In an exemplary embodiment, the second supporting part 32 is divided into a plurality of parts which are formed at all sides of the first supporting part 31. The plurality of parts may form openings in the second supporting part 32 and may be substantially rectangular in shape. The second supporting part 32 faces lateral sides of the LCD panel 20.

In an assembly process, the LCD panel 20 is disposed on the panel supporting part 30, and then the upper cover 10 and the panel supporting part 30 are assembled. The second supporting part 32 secures the LCD panel 20 to prevent separation of the LCD panel 20 from the panel supporting part 30. The second supporting part 32 is formed at all the sides of the panel supporting part 30, thereby preventing the LCD panel 20 from being separated from the panel supporting part 30.

Figure 3:
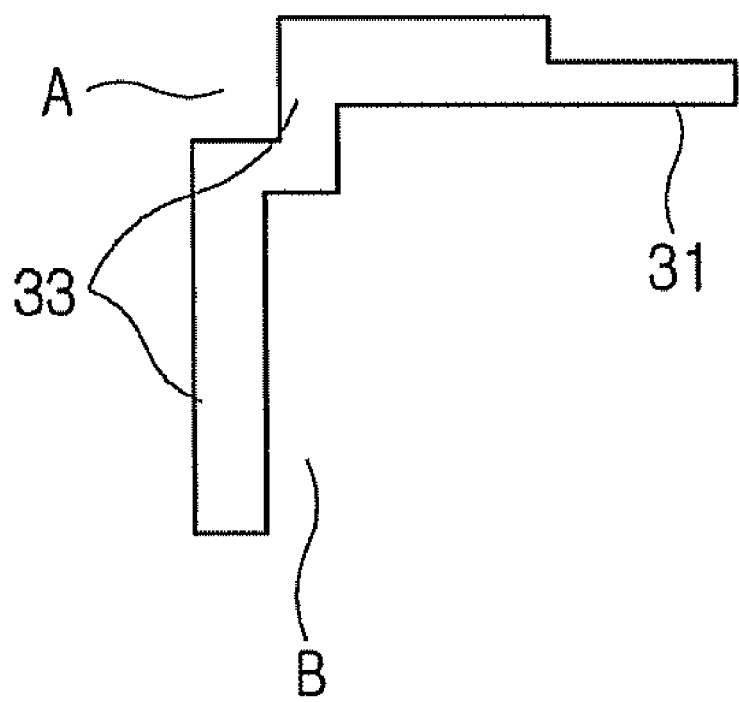
FIG. 3 is a cross-sectional view of the LCD of FIG. 1, taken along line III-III.

The third supporting part 33 is assembled to the first supporting part 31 and the second supporting part 32 and surrounds the backlight unit 2. Referring to FIG. 3, the third supporting part 33 forms a first accommodating space "A" outside and a second accommodating space "B" therein. The second cover part 12 is disposed in the first accommodating space A, and a fourth cover part 72 of the lower cover 70 is disposed in the second accommodating space B.

An opening 34 surrounded by the first supporting part 31 substantially corresponds to the display region of the LCD panel 20, and passes light from the backlight unit 2 toward the LCD panel 20.

The optical film 40 disposed behind the LCD panel 20 may have a substantially rectangular shape. The optical film 40 includes at least one of a diffusion film, a prism film, a reflective polarizing film and a protection film.

The light guiding plate 50 is made of acrylic resin such as poly methylstyrene (polymer of methylmethacrylate and styrene), polymethylmethacrylate ("PMMA"), or the like, and provides light from the lamps 61 uniformly to the optical film 40.

The lamps 61 may be disposed lengthwise at opposite sides of the light guiding plate 50 and may include a cold cathode fluorescent lamp ("CCFL") or an external electrode fluorescent lamp ("EEFL").

The lamps 61 are covered by the lamp covers 62, and the lamp covers 62 reflect light from the lamps 61 to provide the light to the light guiding plate 50. The lamp covers 62 may be formed with two layers, and an inner layer toward the lamps 61 may include polyethylene terephthalate ("PET"), and an outer layer may include aluminum with excellent thermal conductivity.

The reflective plate 63 is disposed below the light guiding plate 50 and reflects incident light to provide the same to the light guiding plate 50. The reflective plate 63 is made of a plastic material such as PET or polycarbonate (PC).

In an exemplary embodiment, the lower cover 70 includes a third cover part 71 having a substantially rectangular shape and the fourth cover part 72 extending upward toward from an edge portion of the third cover part 71. The fourth cover part 72 is disposed between the third supporting part 33 of the panel supporting part 30 and the light guiding plate 50. The lower cover 70 may be made of aluminum, stainless steel or zinc electro plated steel.

A side-type backlight unit is illustrated for illustrative purposes in the first exemplary embodiment; however, other types of backlight units, such as a direct type, may be applicable. Further, a light emitting diode ("LED") may be applicable as a light source in lieu of the lamps 61.

In the aforementioned LCD 1, the upper cover 10 that encompasses the display region of the LCD panel 20 has a narrow width, i.e., the width dl of the first cover part 11 is narrow, which will be explained in the following.

Figure 2:
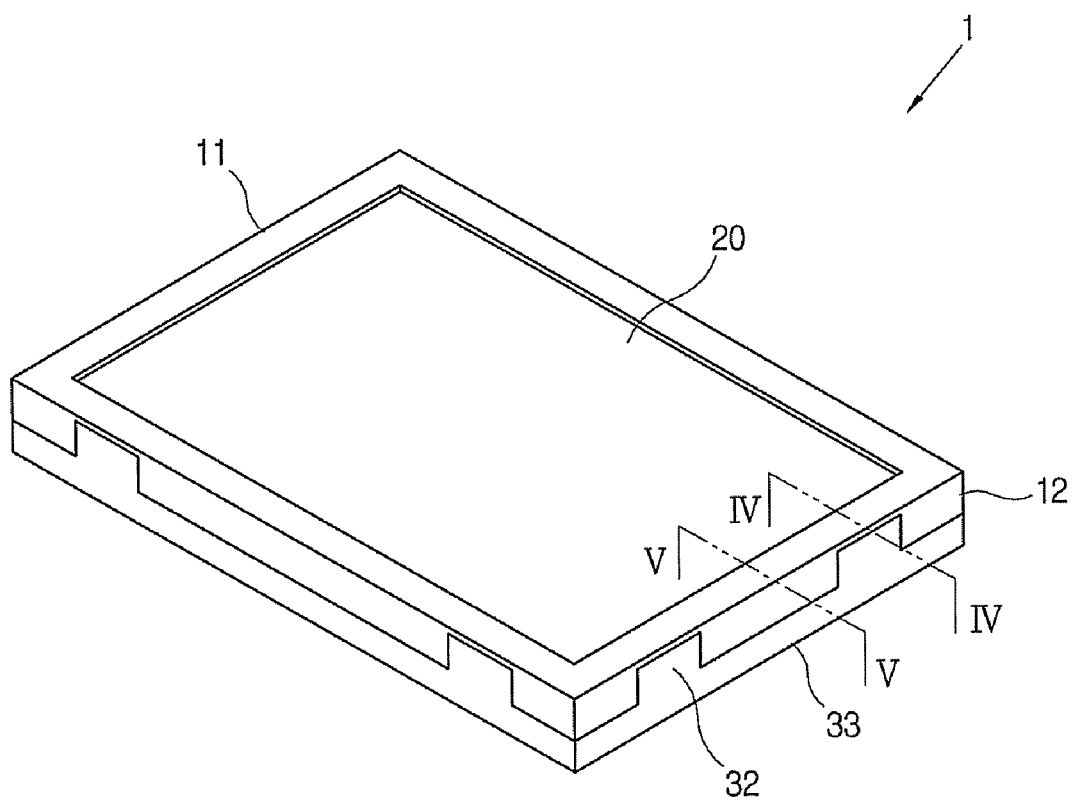
FIG. 2 is a perspective view of the first exemplary embodiment of the liquid crystal display according to the present invention.

As illustrated in FIG. 2, the divided portions of the second cover part 12 of the upper cover 10 and the second supporting part 32 of the panel supporting part 30 are alternately formed thereon, such that the divided portions of the second cover part 12 and the respective sections of the second supporting part 32 interconnect as described herein. The second cover part 12 and the second supporting part 32 are disposed substantially in the same plane, and partially face each other at their lateral sides. In other words, the second cover part 12 and the second supporting part 32 do not overlap with each other in a plane which comprises the surface of the LCD panel 20.

As described above, since the second supporting part 32 does not overlap with the second cover part 12, the width dl of the first cover part 11 is allowed to be narrow. Specifically, the width dl of the second cover part 12 does not need to consider the thickness of the second supporting part 32.

A portion of the third supporting part 33 of the panel supporting part 30 which faces the second cover part 12 of the upper cover 10 is retreated at a predetermined distance to form the first accommodating space A, shown in FIG. 3. The second cover part 12 is disposed in the first accommodating space A and extends in a perpendicular direction to a surface of the LCD panel 20. The second cover part 12 therefore extends downward without increasing the width dl of the first cover 11.

An outside surface of the second cover part 12 and an outside surface of the third supporting part 33, which is not covered with the second cover part 12 are disposed in the same plane.

A part of the third supporting part 33 which faces the backlight unit 2 forms the second accommodating space B, shown in FIG. 3. The fourth cover part 72 of the lower cover 70 is disposed in the accommodating space B, and the width d1 of the upper cover 10 is not increased due to the fourth cover 72.

Although not shown in drawings, a first assembling member is formed in the second cover part 12 and the third supporting part 33 for assembly, and a second assembling member is formed in the fourth cover part 72 and the third supporting part 33 for assembly.

Figure 6:
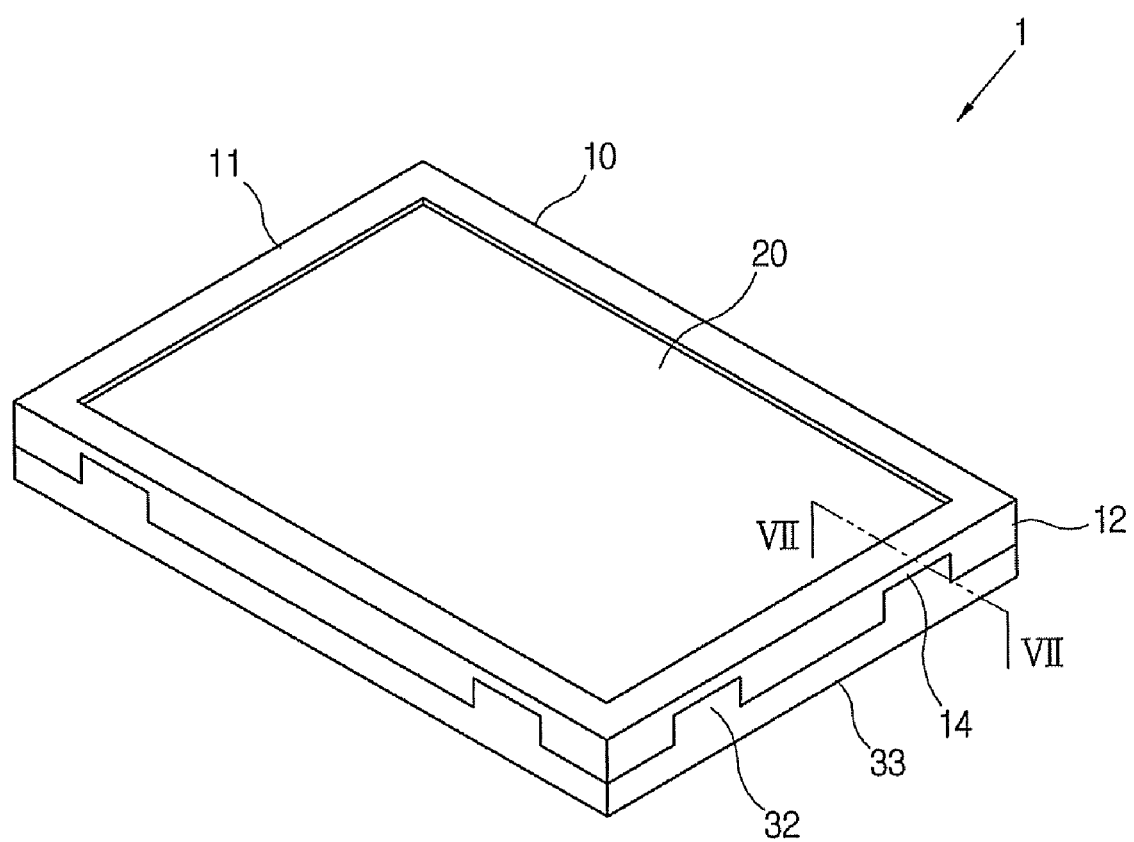
FIG. 6 is a perspective view of a second exemplary embodiment of a liquid crystal display according to the present invention.
Figure 7:
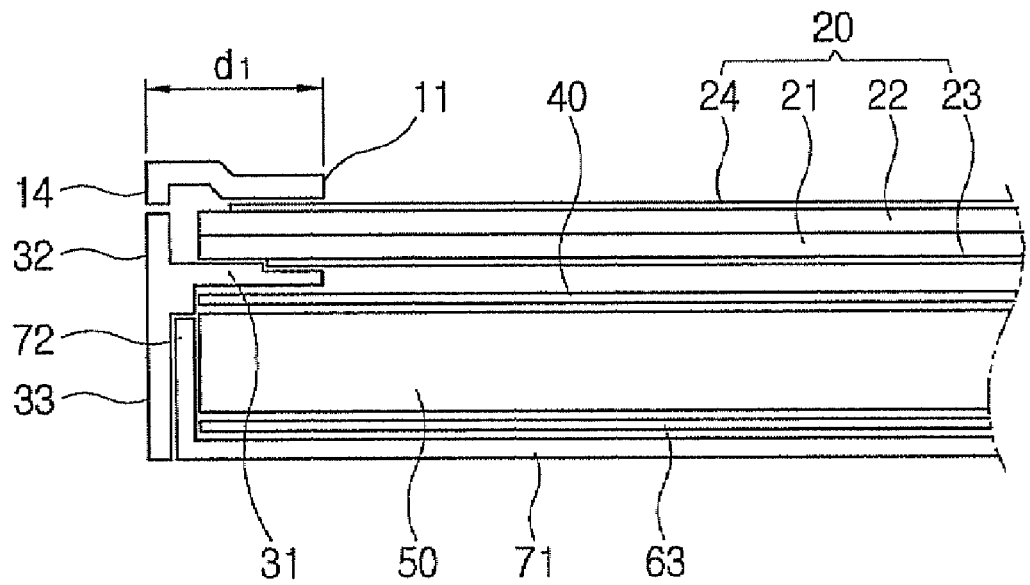
FIG. 7 is a cross-sectional view of the LCD shown in FIG. 6, taken along line VII-VII.

Referring to FIGS. 6 and 7, an LCD 1 according to a second exemplary embodiment of the present invention will be described.

An upper cover 10 includes a fifth cover part 14 which extends downward from an edge portion of a first cover part 11 and is substantially perpendicular to the first cover part 11. The fifth cover part 14 may be shorter in length than the second cover part 12. In addition, the fifth cover part 14 may be narrower in width than the second cover part 12. Alternatively, the fifth cover part 14 may be lengthened to partially face an LCD panel 20.

Figure 8:
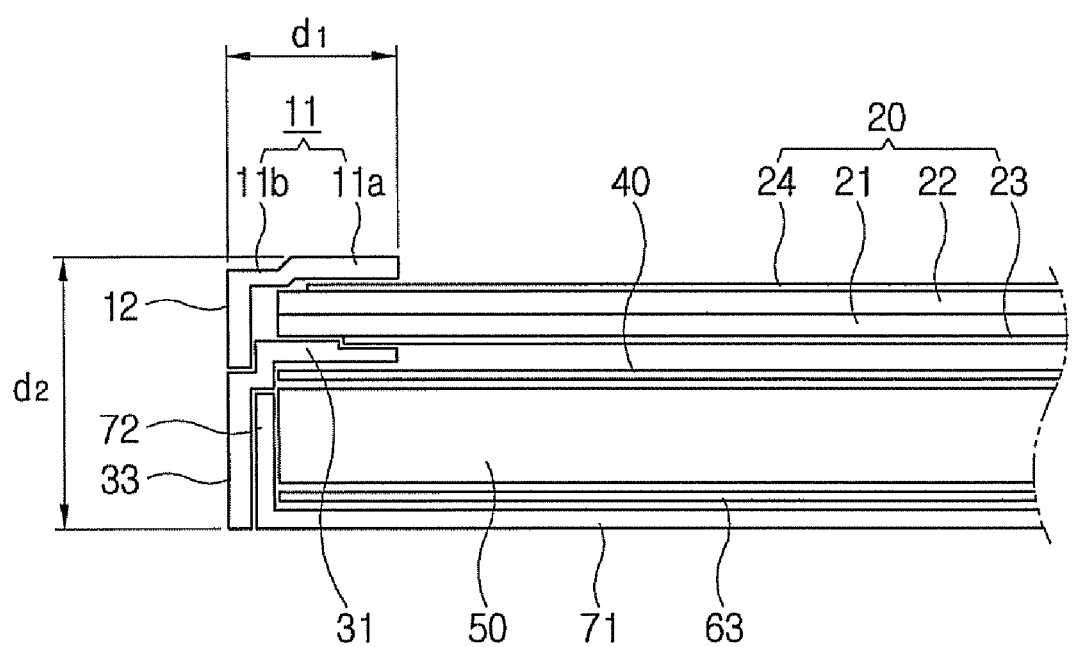
FIG. 8 is a cross-sectional view of a third exemplary embodiment of a liquid crystal display according to the present invention.

Referring to FIG. 8, an LCD 1 according to a third exemplary embodiment of the present invention will be described. FIG. 8 is an equivalent cross-sectional view corresponding to the line taken along V-V in FIG. 2.

A first cover part 11 of an upper cover 10 includes a first sub-part 11a and a second sub-part 11b. The first sub-part 11a and the second sub-part 11b have a shape of a rectangular frame, and the first sub-part 11a is formed to extend higher or above the second sub-part 11b when viewed in a cross-wise direction. The first sub-part 11a may have a rectangular band shape disposed inward, and the second sub-part 11b may have a rectangular band shape which surrounds the first sub-part and is disposed lower than the first sub-part as shown in FIG. 8.

In the third exemplary embodiment, the second sub-part 11b to be connected to a second cover part 12 is decreased in height, thereby reducing the thickness d2 of the LCD 1.

As described above, the present invention provides an LCD of which a cover to surround a screen is decreased in width.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
    a display panel;
    a backlight unit disposed behind the display panel;
    a panel supporting part; and
    a first cover including a first cover part disposed along a non-display region of the display panel and a plurality of second cover parts extending downward from the first cover part,
    wherein the panel supporting part includes:
    a first supporting part disposed between the display panel and the backlight unit, the first supporting part supporting the display panel; and
    a plurality of second supporting parts extending upward from an edge portion of the first supporting part, the second supporting part disposed alternately with the second cover parts,
    wherein the second cover parts and the second supporting part face the lateral side of the display panel.

2. The display device according to claim 1, wherein the second supporting parts and the second cover parts are disposed substantially in a same plane.

3. The display device according to claim 1, wherein lateral sides of the second supporting parts and lateral sides of the second cover parts at least partially face each other.

4. The display device according to claim 1, wherein the second supporting parts and the second cover parts do not overlap with each other in a plane where the display panel is provided.

5. The display device according to claim 1, wherein the first supporting part has a rectangular shape, and at least one of the second supporting parts is provided at every side of the first supporting part.

6. The display device according to claim 1, wherein the first cover part has a rectangular shape, and at least one of the second cover parts is provided at every side of the first cover part.

7. The display device according to claim 1, wherein the panel supporting part further comprises a third supporting part extending from the first supporting part and surrounding a lateral side of the backlight unit.

8. The display device according to claim 7, wherein at least a part of the second cover parts faces the third supporting part and is disposed outside the third supporting part, and the third supporting part which faces the second cover parts forms a first accommodating space, wherein the second cover parts extend in a perpendicular direction to the display panel.

9. The display device according to claim 8, wherein the second cover parts and a part of the third supporting part which is not covered with the second cover parts are disposed substantially in a same plane.

10. The display device according to claim 7, further comprising a second cover including a third cover part disposed below the backlight unit and a fourth cover part extending from the third cover part and surrounding a lateral side of the backlight unit, wherein the fourth cover part extends between the backlight unit and the third supporting part.

11. The display device according to claim 10, wherein the third supporting part which faces the fourth cover part forms a second accommodating space in which the fourth cover part is accommodated.

12. The display device according to claim 1, wherein the first cover part comprises a first sub-part of a rectangular band shape disposed inward; and a second sub-part of a rectangular band shape which surrounds the first sub-part and is disposed lower than the first sub-part.

13. The display device according to claim 1, wherein the display panel comprises a liquid crystal display panel.

14. A display device comprising:
    a display panel;
    a backlight unit disposed behind the display panel;
    a panel supporting part disposed between the display panel and the backlight unit and supporting the display panel; and
    a cover including an opening formed therein to expose a display region of the display panel; wherein
    a first region of a lateral side of the display panel faces the panel supporting part, a second region of the lateral side of the display panel faces the cover, said first region being different from the second region, and the panel supporting part and the cover do not overlap with each other in a plane where the display panel is provided.

15. The display device according to claim 14, wherein the panel supporting part facing the display panel and the cover are disposed substantially in a same plane.

16. The display device according to claim 14, wherein the cover comprises a first cover part disposed along a non-display region of the display panel, and a second cover part extending from the first cover part and facing the second region;

wherein the first cover part includes:

a first sub-part of a rectangular band shape disposed inward; and a second sub-part of a rectangular band shape surrounding the first sub-part, the second sub-part disposed lower than the first sub-part.

17. The display device according to claim 14, wherein the display panel comprises a liquid crystal display panel.

18. A display device comprising:

a display panel;

a backlight unit disposed behind the display panel; and a first frame, comprising:

a base plate disposed along a non-display region of the display panel, the base plate including an opening to expose a display region of the display panel; and a sidewall extending downward from the base plate and being formed with plurality of opened portions; wherein the opened portions are partially overlapped with the lateral side of the display panel.

19. The display device according to claim 18, further comprising a second frame disposed below the display panel, the second frame comprising;

a first plate substantially parallel with the base plate; and a second plate extended from the first plate and filling up the opened portions.

20. The display device according to claim 19, wherein the sidewall and the second plate are disposed substantially in a same plane.

* * * * *